United States Patent [19]

Gilmer

[11] Patent Number: 4,705,542
[45] Date of Patent: Nov. 10, 1987

[54] PRODUCTION OF SYNTHESIS GAS
[75] Inventor: William N. Gilmer, Patterson, N.Y.
[73] Assignee: Texaco Inc., White Plains, N.Y.
[21] Appl. No.: 585,055
[22] Filed: Mar. 1, 1984
[51] Int. Cl.$^4$ .............................................. B01D 53/14
[52] U.S. Cl. .......................................... 55/93; 55/95;
   55/223; 55/244; 48/206; 48/197 R
[58] Field of Search ............... 48/DIG. 2, 197 R, 206;
   55/93, 95, 223, 246, 241, 244, 84, 220, 410, 257
   R; 252/373

[56] References Cited

U.S. PATENT DOCUMENTS

| | | | |
|---|---|---|---|
| 2,656,307 | 10/1953 | Findlay | 55/93 |
| 2,818,326 | 12/1957 | Eastman et al. | 48/206 |
| 3,239,999 | 3/1966 | Price | 55/244 X |
| 4,131,439 | 12/1978 | Holter et al. | 55/220 |
| 4,326,856 | 4/1982 | Muenger et al. | 48/197 R |
| 4,381,187 | 4/1983 | Sederquist | 252/373 X |
| 4,388,084 | 6/1983 | Okane et al. | 48/197 R |
| 4,466,808 | 8/1984 | Koog | 48/197 R |

OTHER PUBLICATIONS

Perry et al., "Chemical Engineers' Handbook", 4th ed., 1963, pp. 5-9.

Primary Examiner—Charles Hart
Attorney, Agent, or Firm—Robert A. Kulason; James J. O'Loughlin; Carl G. Seutter

[57] ABSTRACT

Deposition of ash in the outlet conduit of a synthesis gas quench chamber is reduced or eliminated by providing a streamlined configuration at the mouth and throat of the outlet conduit.

12 Claims, 3 Drawing Figures

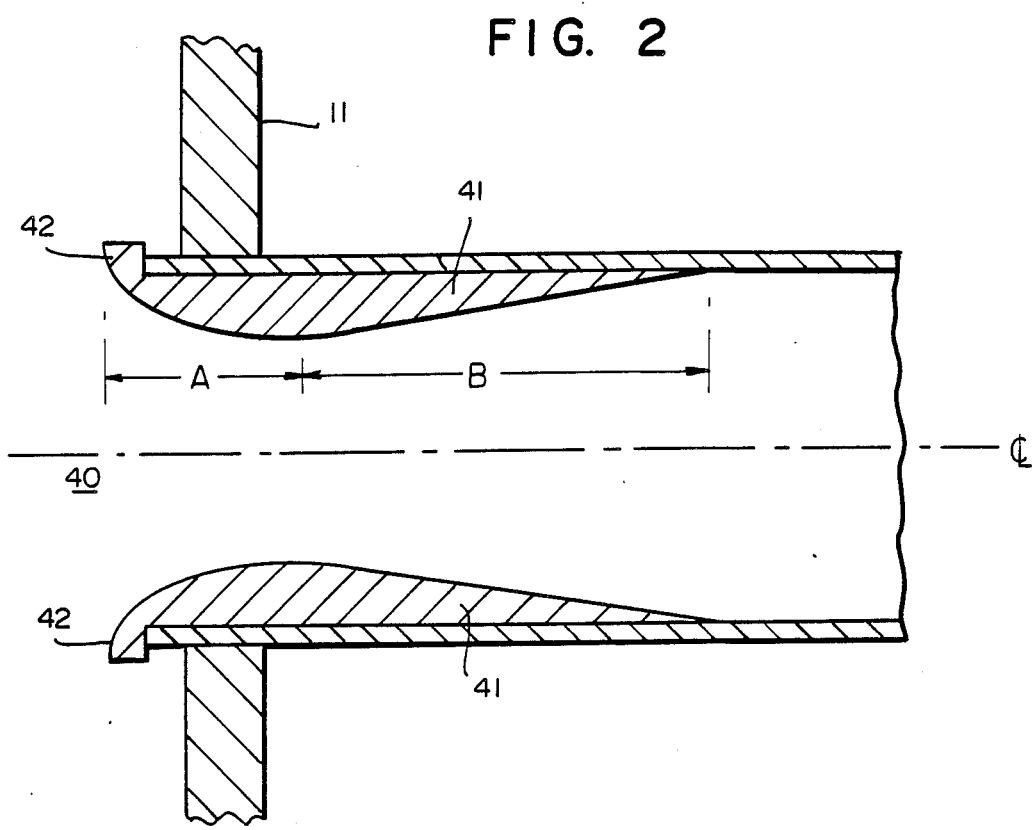
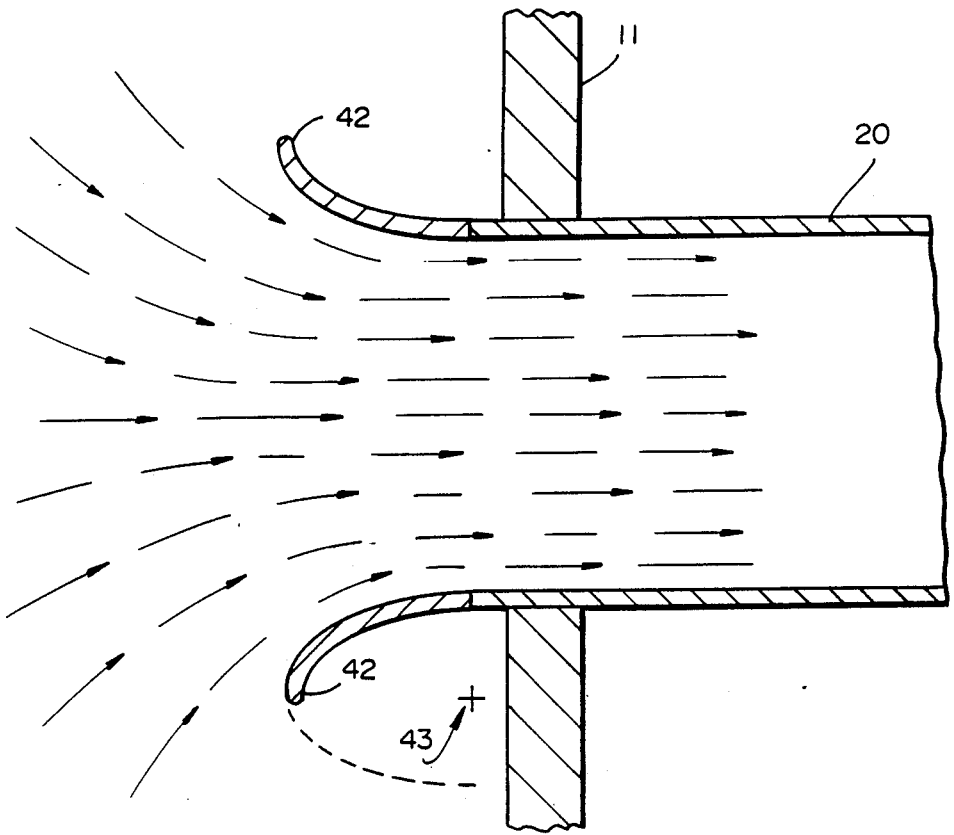

PRODUCTION OF SYNTHESIS GAS

FIELD OF THE INVENTION

This invention relates to the production of synthesis gas. More particularly it relates to the production of synthesis gas from an ash-containing carbonaceous charge under conditions which minimize the deposition of ash in the outlet from the gas quench chamber.

BACKGROUND OF THE INVENTION

As is well known to those skilled in the art, synthesis gas may be prepared from ash-containing carbonaceous fuel including liquid or solid charge materials. When the charge is characterized by high ash content as may be the case with residual liquid hydrocarbons or solid carbonaceous fuels such as coals of low rank, the high ash content poses an additional burden. The ash must be separated from the product synthesis gas; and the large quantities of ash which accumulate in the system must be efficiently removed from the system and prevented from blocking the various conduits and passageways.

It has been found that the exit conduit or passageway from the quench chamber is particularly susceptible to plugging by fine particles of ash which deposit therein.

It is an object of this invention to provide a process for producing synthesis gas under conditions wherein build-up of ash in the exit conduit is kept within acceptable limits. Other objects will be apparent to those skilled in the art.

STATEMENT OF THE INVENTION

In accordance with certain of its aspects, this invention is directed to a method of cooling from an initial high temperature to a lower final temperature, a hot synthesis gas containing solids under conditions which permit removal of solids from said gas which comprises passing said hot synthesis gas at initial high temperature downwardly through a first contacting zone;

passing cooling liquid downwardly as a film on the walls of said first contacting zone and in contact with said downwardly descending synthesis gas thereby cooling said synthesis gas and forming a cooled synthesis gas;

passing said synthesis gas into a body of aqueous cooling liquid in a second contacting zone thereby forming a further cooled synthesis gas containing a decreased content of solid particles;

recovering said further cooled synthesis gas containing a decreased content of solid particles;

passing said further cooled synthesis gas containing a decreased content of solid particles in streamline flow into and through a discharge conduit whereby the deposition of solid particles in said discharge conduit is decreased; and withdrawing said synthesis gas containing a decreased content of solid particles from said discharge conduit.

DESCRIPTION OF THE INVENTION

The synthesis gas which may be prepared by the process of this invention may be prepared by the gasification of coal. In a typical coal gasification process, the charge coal which has been finely ground typically to an average particle size of 20-500 microns, preferably 30-300, say 200 microns, may be slurried with an aqueous medium, typically water, to form a slurry containing 40-80 w %, preferably 50-75 w %, say 60 w % solids. The aqueous slurry may then be admitted to a combustion chamber wherein it is contacted with oxygen-containing gas, typically air or oxygen or air enriched with oxygen, to effect combustion. The atomic ratio of oxygen to carbon in the system may be 0.7-1.2:1, say 0.9:1. Typically reaction is carried out at 1800° F.-2800° F., say 2500° F. and pressure of 100-1500 psig, preferably 500-1200, say 900 psig.

The synthesis gas may alternatively be prepared by the incomplete combustion of liquid hydrocarbon such as residual fuel oil, asphalt, etc. or of a solid carbonaceous material such as coke from petroleum or from tar sands, bitumen carbonaceous residues from coal hydrogenation processes, etc.

The apparatus which may be used in practice of this invention may include a gas generator such as is generally set forth in the following patents inter alia:

| U.S. Pat. No. | |
| --- | --- |
| 2,818,326 | Eastman et al |
| 2,896,927 | Nagel et al |
| 3,998,609 | Crouch et al |
| 4,218,423 | Robin et al |

Effluent from the reaction zone in which charge is gasified to produce synthesis gas may be at a temperature of 1800° F.-2800° F., say 2500° F. at 100-1500 psig, preferably 500-1200 psig, say 900 psig.

Under these typical conditions of operation the synthesis gas commonly contains (dry basis) 35-55 v %, say 44.7 v %, carbon monoxide; 30-45 v %, say 35,7 v % hydrogen; 10-20 V %, say 18 v %, carbon dioxide, 0.3 v %-2 v %, say 1 v % hydrogen sulfide plus COS; 0.4-0.8 v %, say 0.5 v % nitrogen+argon; and methane in amount less than about 0.1 v %.

When the fuel is a solid carbonaceous material, the unscrubbed product synthesis gas may commonly contain solids (including ash, char, slag, etc) in amount of 1-10 pounds, say 4 pounds per thousand SCF of dry product gas; and these solids may be present in particle size of less than 1 micron up to 3000 microns. The charge coal may contain ash in amount as little as 0.5 w % or as much as 40 w % or more. This ash is found in the product synthesis gas. Although the improved process of this invention will provide some benefit when the synthesis gas contains small amounts of ash, it is found to be particularly advantageous when the gas contains solids in amount of 3% or more.

The hot synthesis gas at this initial temperature of 1800° F.-2800° F., say 2500° F. is passed downwardly through a first contacting zone. The upper extremity of the first contacting zone may be defined by the lower outlet portion of the reaction chamber of the gas generator. The first contacting zone may be generally defined by an upstanding preferably vertical perimeter wall forming an attenuated conduit, and the cross-section of the zone formed by the wall is in the preferred embodiment substantially cylindrical. The outlet or lower end of the attenuated conduit or dip tube at the lower extremity of the preferably cylindrical wall preferably bears a serrated edge.

The first contacting zone is preferably bounded by the upper portion of a vertically extending, cylindrical dip tube which has its axis colinear with respect to the combustion chamber.

At the upper extremity of the first contacting zone in the dip tube, there is mounted a quench ring through which cooling liquid, commonly water, is admitted to the first contacting zone. From the quench ring, there is directed a first stream of cooling liquid along the inner surface of the dip tube on which it forms a preferably continuous downwardly descending film of cooling liquid which is in contact with the downwardly descending synthesis gas. Inlet temperature of the cooling liquid may be 100° F.–500° F., preferably 300° F.–480° F., say 420° F. The cooling liquid is admitted to the falling film on the wall of the dip tube in amount of 20–120, preferably 30–100, say 85 pounds per thousand SCF of gas admitted to the first contacting zone.

The cooling liquid admitted to the contacting zones, and particularly that admitted to the quench ring, may include recycled liquids which have been treated to lower their solids content.

As the falling film of cooling liquid contacts the downwardly descending hot synthesis gas, the temperature of the latter may drop by 200° F.–400° F., preferably 300° F.–400° F., say 300° F. because of contact with the falling film during its passage through the first contacting zone.

The gas may pass through the first contacting zone for 0.1–1 seconds, preferably 0.1–0.5 seconds, say 0.3 seconds at a velocity of 6–30, say 20 ft/sec. Gas exiting this first zone may have a reduced solids content, and be at a temperature of 1400° F.–2300° F., say 2200° F.

The gas leaves the lower extremity of the first contacting zone and passes into a second contacting zone wherein it contacts a body of cooling liquid. In this second contacting zone, the gas passes under a serrated edge of the dip tube.

The lower end of the dip tube is submerged in a pool of liquid formed by the collected cooling liquid which defines the second contacting zone. The liquid level, when considered as a quiescent pool, may typically be maintained at a level such that 10%–80%, say 50% of the second contacting zone is submerged. It will be apparent to those skilled in the art that at the high temperature and high gas velocities encountered in practice, there may of course be no identifiable agitated body of liquid.

The further cooled synthesis gas leaves the first contacting zone at typically 600° F.–900° F., say 800° F. and it passes through the body of cooling liquid in the second contacting zone and under the lower typically serrated edge of the dip tube. The solids fall through the body of cooling liquid wherein they are retained and collected and may be drawn off from a lower portion of the body of cooling liquid.

Commonly the gas leaving the second contacting zone may have had 75% or more of the solids removed therefrom.

The further cooled gas at 600° F.–900° F., say 800° F. leaving the body of cooling liquid which constitutes the second contacting zone is preferably passed together with cooling liquid upwardly through a preferably annular passageway through a third contacting zone toward the gas outlet of the quench chamber. In one embodiment, the annular passageway is defined by the outside surface of the dip tube forming the first cooling zone and the inside surface of the vessel which envelops or surrounds the dip tube and which is characterized by a larger radius than that of the dip tube.

In an alternative embodiment, the annular passageway may be defined by the outside surface of the dip tube forming the first and second contacting zones and the inside surface of a circumscribing draft tube which envelopes or surrounds the dip tube and which is characterized by larger radius than that of the dip tube.

As the mixture of cooling liquid and further cooled synthesis gas (at inlet temperature of 600° F.–900° F., say 800° F.) passes upwardly through the annular third cooling zone, the two phase flow therein effects efficient heat transfer from the hot gas to the cooling liquid: the vigorous agitation in this third cooling zone minimizes deposition of the particles on any of the contacted surfaces. Typically the cooled gas exits this annular third contacting zone at temperature of 350° F.–600° F., say 500° F. The gas leaving the third contacting zone contains 0.1–2.5, say 0.4 pounds of solids per 1000 SCF of gas i.e. about 85%–95% of the solids will have been removed from the gas.

The solids, particles of ash (including charge and unconverted fuel) which are removed from the synthesis gas during contact with water in the contacting zone, are passed downwardly into a settling zone in the lower portion of the contacting zone. Here the particles accumulate. Intermittently they may be withdrawn through a first valved passageway during a valve-open period and passed to a lock hopper wherein the solids accumulate. Typically the material fed to the lock hopper may contain 10–50 parts of solids, say 30 parts of solid per 100 parts of water. The pressure in the lock hopper may typically be 100–1500 psig, say 900 psig and the temperature at 100° F.–120, say 180° F. Solids may be withdrawn from the bottom of the lock hopper through a second valved passageway and withdrawn from system.

The gas leaving the third contacting zone is withdrawn from the quench chamber. It first passes through an entrance section of a gas outlet conduit and then through the remainder of the gas outlet conduit. It has heretofore been found that the entrance section of the gas outlet conduit becomes plugged because of the deposition therein of an agglomeration of ash fines from combustion.

In a typical instance, which utilizes an outlet conduit from the gas quench chamber of 40 cm diameter, these particles of ash are found to occupy a length of 1–5 diameters, say 2 diameters from the entrance to that conduit i.e. 40–200 cm, say 80 cm. The ash readily forms massive deposits which occupy a substantial portion of the total cross-section area of the outlet conduit.

In accordance with practice of the process of this invention, this deposition is minimized, and in many instances eliminated, by utilizing an outlet conduit from the gas quench chamber, the entrance portion of which is streamlined. Streamlined, as the term is used in this specification, means that the entrance (mouth and preferably throat) portion is so constructed that the lines of flow of the incoming gas stream are continuous and essentially non-turbulent over the entrance portion of the conduit and adjacent thereto.

In the preferred embodiments, the mouth of the outlet conduit may be characterized by elimination of sharp edges. Typically the mouth may be rounded or flared to the end that the flow lines of the entering gas are essentially streamline. The curvature of this portion may be characterized as bell-shaped, trumpet-shaped, rounded, etc. It may possess a shape when viewed in cross-section of a simple geometric (conic) figure such as a parabola, a hyperbola, an ellipse, or a circle or even a tractus, a lituus, a witch, a spiral (of Archimedes), etc.

It is also preferred that the throat portion of the outlet conduit (i.e. that portion thereof immediately adjacent the mouth portion and extending into the conduit for several diameters thereof) possess a streamlined constricted area. The throat portion of the outlet conduit may for example be substantially in the form of a pseudospherical surface of revolution eg of the elliptic type of pseudospherical surface or the parabolic type of pseudospherical surface or of the hyperbolic type of pseudospherical surface or of the tractrix type of pseudospherical surface, etc. See for example Mathematics Dictionary James/James 4Ed, Van Nostrand-Reinhold (1976).

In one preferred embodiment, the throat section may be venturi-shaped.

It will be clear to those skilled in the art that the mouth or throat portions need not be of precisely the noted geometric configuration—but that the smooth curves may be reasonable approximations of the configuration of such curves.

Whether the entrance portion of the outlet conduit possesses these configurations in both the mouth and in the throat portions, it is found that deposition of solids in the conduit may be decreased. In the preferred configuration in which the outlet conduit possesses these configurations in both the mouth and the throat, it will be apparent that the flared mouth portion eliminates interruptions in the streamline flow and permits non-turbulent flow at a constant rate into the conduit; and the constricted or throat section serves to eliminate areas which would otherwise be "backwash" or eddies or turbulent areas in which solids would deposit. The increase in velocity arising from the preferred venturi-type configuration (and the resulting decrease in turbulent areas) results in a minimum deposition and build-up of solids on the surfaces of the outlet conduit.

It should be noted that the surface at the throat portion may not follow precisely the geometric curve over its entire length, but that the surface may generally be represented reasonably closely by a sector or portion of the stated geometric curve. The result of this configuration is that the flow of gas is essentially in the streamlined mode in preferably both the mouth and throat of the outlet conduit; and deposition of solids is minimized.

It will be found that deposition of solids from the solid laden gas will be decreased in the discharge conduit of this novel quench tube assembly, which comprises an attenuated upstanding dip tube having inner and outer perimetric surfaces, and an upper inlet end and a lower outlet end:

an outlet portion of said dip tube adjacent to the outlet end thereof;

a quench ring adjacent to the inner perimetric surface at the inlet end of said dip tube and adapted to direct a curtain of liquid along the inner perimetric surface of said dip tube and toward the outlet end of said dip tube;

serrations on the outlet end of said outlet portion of said dip tube;

a discharge conduit leading from said quench chamber adjacent to the upper inlet end of said attenuated upstanding dip tube; and a streamline mouth portion at the entrance to said discharge conduit;

whereby charge gas admitted to the inlet end of said dip tube may be contacted with a film of cooling liquid passing downwardly through a first contacting zone in said dip tube, a second contacting zone in said dip tube wherein it is contacted with a body of cooling liquid, upwardly through a third contacting zone in contact with cooling liquid, and laterally in streamline flow through the mouth portion at the entrance to said discharge conduit thereby decreasing deposition of solid particles contained in said charge gas in said discharge conduit.

DESCRIPTION OF THE DRAWINGS

FIG. 2 shows, in greater detail, the outlet conduit 20 of FIG. 1.

FIG. 3 shows an alternative embodiment of the entrance to the outlet conduit and particularly the mouth portion thereof.

DESCRIPTION OF PREFERRED EMBODIMENTS

Figure 1:
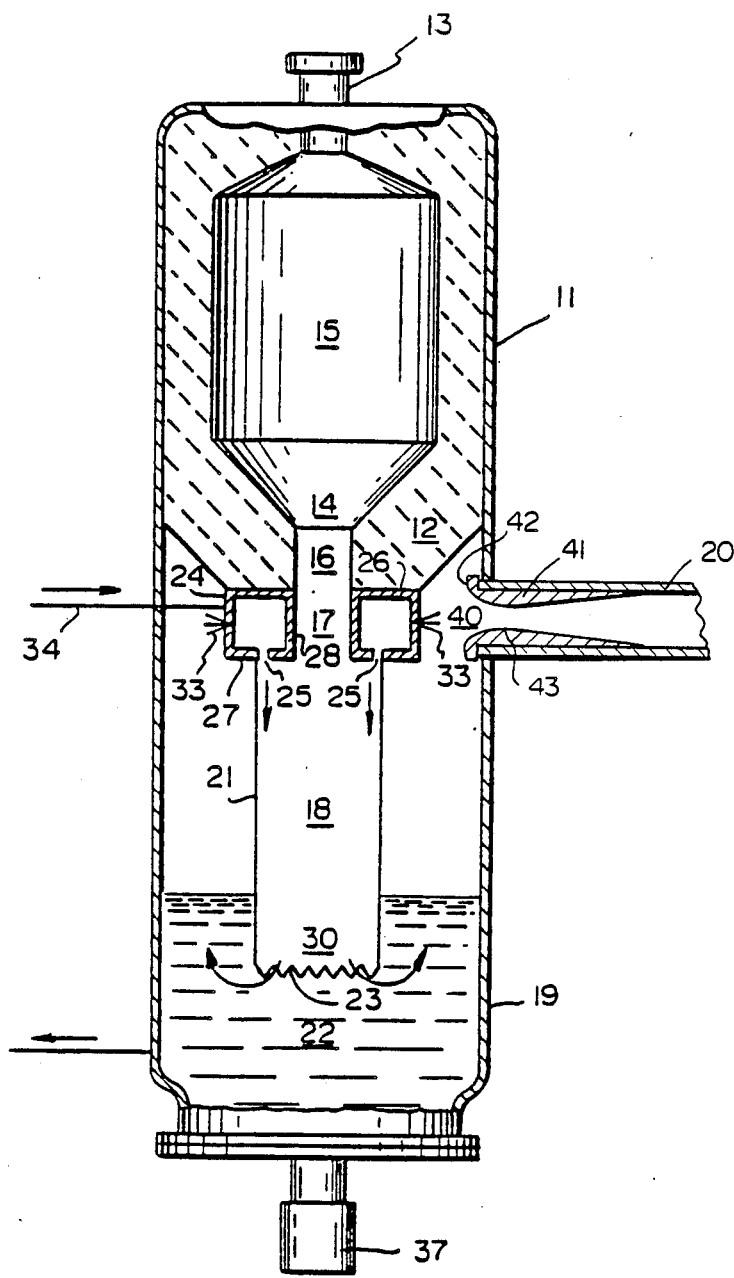
FIG. 1 of the drawing show a schematic vertical section of a preferred embodiment of this invention illustrating a generator and associated therewith a quench chamber and outlet conduit.

In this Example which represents the best mode of practicing the invention known at this time, there is provided a reaction vessel 11 having a refractory lining 12 and inlet nozzle 13. The reaction chamber 15 has an outlet portion 14 which includes a narrow throat section 16 which feeds into opening 17. Opening 17 leads into first contacting zone 18 inside of dip tube 21. The lower extremity of dip tube 21, which bears serrations 23, is immersed in bath 22 of quench liquid. The quench chamber 19 includes, preferably at an upper portion thereof, a gas discharge conduit 20.

A quench ring 24 is mounted at the upper end of dip tube 21. This quench ring may include an upper surface 26 which preferably rests against the lower portion of the lining 12 of the vessel 11. A lower surface 27 of the quench ring preferably rests against the upper extremity o the dip tube 21. The inner surface 28 of the quench ring may be adjacent to the edge of opening 17.

Quench ring 24 includes outlet nozzles 25 which may be in the form of a series of holes or nozzles around the periphery of quench ring 24—positioned immediately adjacent to the inner surface of dip tube 21. The liquid projected through passageways or nozzles 25 passes in a direction generally parallel to the axis of the dip tube 21 and forms a thin falling film of cooling liquid which descends on the inner surface of dip tube 21. This falling film of cooling liquid forms an outer boundary of the first contacting zone.

At the lower end of the first contacting zone 18, there is a second contacting zone 30 which extends downwardly toward serrations 23 and which is also bounded by the portion of the downwardly descending film of cooling liquid which is directed towards the wall on the lower portion of dip tube 21.

The solids, including particles of ash, char, and unconverted fuel which are removed from the gas by contact with the water in bath 22 accumulate and collect in the lower portion of the body of liquid 22. Once during an operating cycle, valve 37 is closed and the particles are maintained in the settling zone. For the remainder of the cycle during a valve-open period, valve 37 is opened and the particles pass downwardly through valve 37 and are withdrawn from the system.

The gas flows downwardly past serrations 23 into the third contacting zone, and upwardly therein between the outer circumference of dip tube 21 and quench chamber 19.

The further cooled synthesis gas containing a decreased content of solid particles flows upwardly towards discharge conduit 20. The gas enters the discharge conduit 20. In this preferred embodiment, there is mounted a venturi-insert in the inlet or entrance portion of the discharge conduit 20. It is then sprayed with liquid through sprays 33.

The mouth 40 of the gas outlet or discharge conduit 20 includes an insert 41 which in this embodiment includes a mouth portion 42 and a throat portion 43, the latter possessing the configuration of a venturi. At the downstream portion of the throat, the cross-section of the passage gradually increases in diameter until it is equal to the full diameter of the discharge conduit 20. For most efficient operation, the half-angle formed between the surfaces downstream of the throat and the centerline of conduit 20 should be in the range of 5°–10°, preferably 7°.

Because of the structure of insert 41, the stream of gas entering the discharge conduit is in steady streamline flow. The solid-laden gas passes smoothly through the mouth and throat of this area; and there are no areas in which there are eddies or turbulent flow. It will be found that as a result of this structural configuration, there are substantially no deposits (or build-up) of solids in the discharge conduit.

FIG. 2 shows the structure of insert 41 in greater detail. It includes a mouth portion 42 in the form of an ellipse having a ratio of diameters of 2:1 extending over the length designated A. The throat portion, extending over the length designated B, is in the form of a portion of a surface of a cone having a half-angle at the apex of 7°.

EXAMPLE II

In operation of the process of this invention utilizing the preferred embodiment of the apparatus of FIG. 1, there is admitted through inlet nozzle 13, a slurry containing 100 parts per unit time (all parts are by weight unless otherwise specifically stated) of charge coal and 60 parts of water. This charge coal is characterized as follows:

TABLE

| Component | Weight % (dry) |
|---|---|
| Carbon | 67.6 |
| Hydrogen | 5.2 |
| Nitrogen | 3.3 |
| Sulfur | 1.0 |
| Oxygen | 11.1 |
| Ash | 11.8 |

There are also admitted 90 parts of oxygen of purity of 99.5 v %. Combustion in chamber 15 raises the temperature to 2500° F. at 900 psig. Product synthesis gas, passed through outlet portion 14 and throat section 16, may contain the following gaseous components.

TABLE

| | Volume % | |
| Component | Wet Basis | Dry Basis |
|---|---|---|
| CO | 35.7 | 44.7 |
| $H_2$ | 28.5 | 35.7 |
| $CO_2$ | 14.4 | 18 |
| $H_2O$ | 20 | — |
| $H_2O$ + COS | 0.9 | 1.1 |
| $N_2$ + Argon | 0.4 | 0.5 |
| $CH_4$ | 0.08 | 0.1 |

This synthesis gas may also contain about 4.1 pounds of solid (char and ash) per 1000 SCF dry gas.

The product synthesis gas (235 parts) leaving the throat section 16 passes through opening 17 in the quench ring 24 into first contacting zone 18. Aqueous cooling liquid at 420° F. is admitted through inlet line 34 to quench ring 24 from which it exits through outlet nozzles 25 as a downwardly descending film on the inner surface of dip tube 21 which defines the outer boundary of first contacting zone 18. As synthesis gas, entering the first contacting zone at about 2500° F., passes downwardly through the zone 18 in contact with the falling film of aqueous cooling liquid, it is cooled to about 2150° F.–2200° F.

The so-cooled synthesis gas is then admitted to the second contacting zone 30. It passes under serrated edge 23 into contact with the body of liquid. Although the drawing shows a static representation having a delineated "water-line", it will be apparent that in operation, the gas and the liquid in the second contacting zone will be in violent turbulence as the gas passes downwardly through the body of liquid, leaves the dip tube 21 passing serrated edge 23 thereof, and passes upwardly through the body of liquid outside the dip tube 21.

The further cooled synthesis gas, during its contact with cooling liquids loses at least a portion of its solids content. Typically the further cooled synthesis gas containing a decreased content of ash particles leaving the body of liquid 22 in second contacting zone 30 contains solids (including ash and char) in amount of about 0.6 pounds per 1000 SCF dry gas.

The exiting gas at 500° F. is admitted to the mouth 40 of discharge conduit 20. Here it passes mouth portion 42 and throat portion 43 of venturi configuration as it leaves the system.

It is found that the solid content of the exit gases passes through the discharge conduit 20 without deposition therein. In prior systems wherein the exit gas passed into a conduit which did not have the described mouth portion 42 or throat portion 43, it was found that there was a substantial build up of solids in the area generally occupied by the structure 42 and 43 and ultimately the build-up reached a point at which it was necessary to shut down the entire unit for cleaning.

EXAMPLE III

FIG. 3 shows an alternative less preferred embodiment of this invention wherein the discharge conduit 20 is fitted with a bell or trumpet shape as the mouth portion 42 and there is no reduction in the diameter of the passage below that of the conduit 20. This embodiment will be found to provide a decreased amount of deposition in the discharge conduit and particularly in the mouth and throat areas thereof.

In this embodiment, the shape of the mouth portion is elliptical (having a ratio of long diameter to short diameter of 2:1) and one focus of the ellipse is at 43.

Although this invention has been illustrated by reference to specific embodiments, it will be apparent to those skilled in the art that various changes and modification may be made which clearly fall within the scope of this invention.

I claim:

1. The method of cooling from an initial high temperature to a lower final temperature, a hot synthesis gas containing solids under conditions which permit removal of solids from said gas which comprises passing said hot synthesis gas at initial high temperature downwardly through a first contacting zone;
passing cooling liquid downwardly as a film on the walls of said first contacting zone and in contact with said downwardly descending synthesis gas thereby cooling said synthesis gas and forming a cooled synthesis gas;

passing said synthesis gas into a body of aqueous cooling liquid in a second contacting zone thereby forming a further cooled synthesis gas containing a decreased content of solid particles;

recovering said further cooled synthesis gas containing a decreased content of solid particles;

passing said further cooled synthesis gas containing a decreased content of solid particles in streamline flow in a discharge conduit whereby the deposition of solid particles in said conduit is decreased; and withdrawing said synthesis gas containing a decreased content of solid particles from said discharge conduit.

2. The method claimed in claim 1 wherein said further cooled synthesis gas containing a decreased content of solid particles is passed in streamline flow into said discharge conduit.

3. The method claimed in claim 1 wherein said further cooled synthesis gas containing a decreased content of solid particles is passed in streamline flow through said discharge conduit.

4. The method claimed in claim 1 wherein said further cooled synthesis gas containing a decreased content of solid particles is passed in streamline flow through a rounded mouth portion of said discharge conduit into said discharge conduit.

5. The method claimed in claim 1 wherein said further cooled synthesis gas containing a decreased content of solid particles is passed in streamline flow through an ellipically shaped mouth portion of said discharge conduit into said discharge conduit.

6. The method claimed in claim 1 wherein said further cooled synthesis gas containing a decreased content of solid particles is passed in streamline flow through the throat portion of said discharge conduit.

7. The method claimed in claim 1 wherein said further cooled synthesis gas containing a decreased content of solid particles is passed in streamline flow through a venturi-shaped passageway in the throat portion of said discharge conduit.

8. The method of cooling from an initial high temperature to a lower final temperature, a hot synthesis gas containing solids under conditions which permit removal of solids from said gas which comprises passing said hot synthesis gas at initial high temperature downwardly through a first contacting zone;

passing cooling liquid downwardly as a film on the walls of said first contacting zone and in contact with said downwardly descending synthesis gas thereby cooling said synthesis gas and forming a cooled liquid in a second contacting zone thereby forming a further cooled synthesis gas containing a decreased content of solid particles;

recovering said further cooled synthesis gas containing a decreased content of solid particles;

passing said further cooled synthesis gas containing a decreased content of solid particles in streamline flow into and through a discharge conduit whereby the deposition of solid particles in said conduit is decreased; and withdrawing said synthesis gas containing a decreased content or solid particles from said discharge conduit.

9. The method claimed in claim 8 wherein the further cooled synthesis gas containing a decreased content of solid particles is passed through a rounded mouth portion of said discharge conduit and then through a venturi throat portion of said discharge conduit.

10. The method of cooling from an initial high temperature of 1800° F.–2800° F. to a lower final temperature, a hot synthesis gas containing solids under conditions which permit removal of solids from said gas which comprises passing said hot synthesis gas at initial high temperature of 1800° F.–2800° F. downwardly through a first contacting zone;

passing cooling liquid downwardly as a film on the walls of said first contacting zone and in contact with said downwardly descending synthesis gas thereby cooling said synthesis gas by 200° F.–400° F. and forming a cooled synthesis gas;

passing said synthesis gas into a body of aqueous cooling liquid in a second contacting zone thereby forming a further cooled synthesis gas containing a decreased content of solid particles;

recovering said further cooled synthesis gas containing a decreased content of solid particles;

passing said further cooled synthesis gas at 350° F.–650° F. containing a decreased content of solid particles in streamline flow into and through a discharge conduit whereby the deposition of solid particles in said conduit is decreased; and withdrawing said synthesis gas containing a decreased content or solid particles from said discharge conduit.

11. A quench chamber assembly which comprises an attenuated upstanding dip tube having inner and outer perimetric surfaces, and an upper inlet end and a lower outlet end;

an outlet portion of said dip tube adjacent to the outlet end thereof;

a quench ring adjacent to the inner perimetric surface at the inlet end of said dip tube and adapted to direct a curtain of liquid along the inner perimetric surface of said dip tube and toward the outlet end of said dip tube;

serrations on the outlet end of said outlet portion of said dip tube;

a discharge conduit leading from said quench chamber adjacent to the upper inlet end of said attenuated upstanding dip tube; and a streamline mouth portion at the entrance to said discharge conduit;

whereby charge gas admitted to the inlet end of said dip tube may be contacted with a film of cooling liquid passing downwardly through a first contacting zone in said dip tube, a second contacting zone in said dip tube wherein it is contacted with a body of cooling liquid, a third contacting zone wherein it is further in contact with cooling liquid, and then laterally in streamline flow through the mouth portion at the entrance to said discharge conduit thereby decreasing deposition of solid particles contained in said charge gas in said discharge conduit.

12. A quench chamber assembly which comprises an attenuated upstanding dip tube having inner and outer perimetric surfaces, and an upper inlet end and a lower outlet end;

an outlet portion of said dip tube adjacent to the outlet end thereof;

a quench ring adjacent to the inner perimetric surface at the inlet end of said dip tube and adapted to direct a curtain of liquid along the inner perimetric surface of said dip tube and toward the outlet end of said dip tube;

serrations on the outlet end of said outlet portion of said dip tube;

a discharge conduit leading from said quench chamber adjacent to the upper inlet end of said attenuated upstanding dip tube; and a streamline throat portion in said discharge conduit;

whereby charge gas admitted to the inlet end of said dip tube may be contacted with a film of cooling liquid passing downwardly through a first contacting zone in said dip tube, a second contacting zone in said dip tube wherein it is contacted with a body of cooling liquid, a third contacting zone wherein it is in contact with cooling liquid, and then laterally in streamline flow through the throat portion at the entrance to said discharge conduit thereby decreasing deposition of solid particles contained in said charge gas in said discharge conduit.

* * * * *